(No Model.)  2 Sheets—Sheet 1.

G. W. BROWN.
SIGNALING APPARATUS.

No. 347,319. Patented Aug. 17, 1886.

WITNESSES:
H. Brown.
J. E. O'Connor

INVENTOR:
G. W. Brown
by Wright & Brown
Attys (No Model.) 2 Sheets—Sheet 2.
G. W. BROWN.
SIGNALING APPARATUS.
No. 347,319. Patented Aug. 17, 1886.
Fig. 12.
Fig. 14.
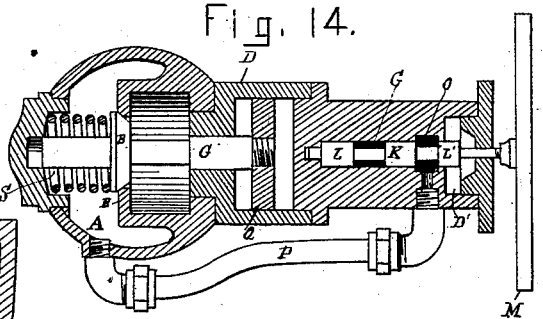
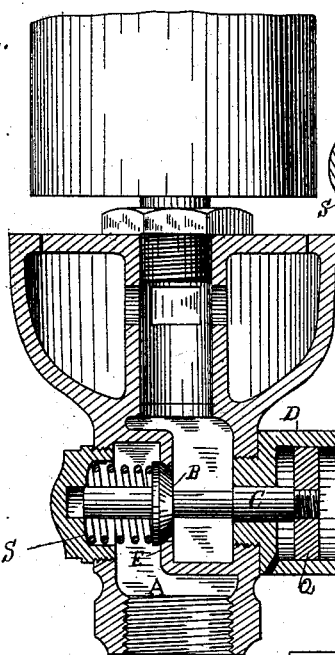
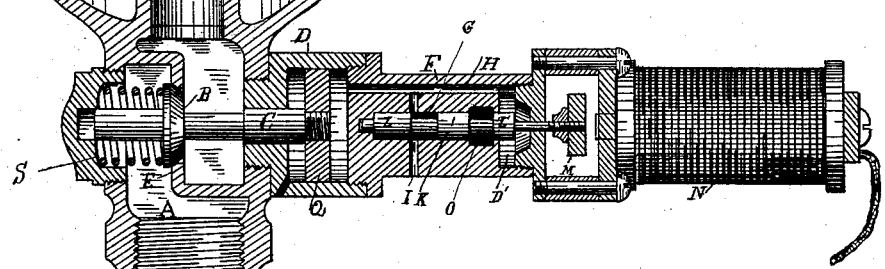
Fig. 13.
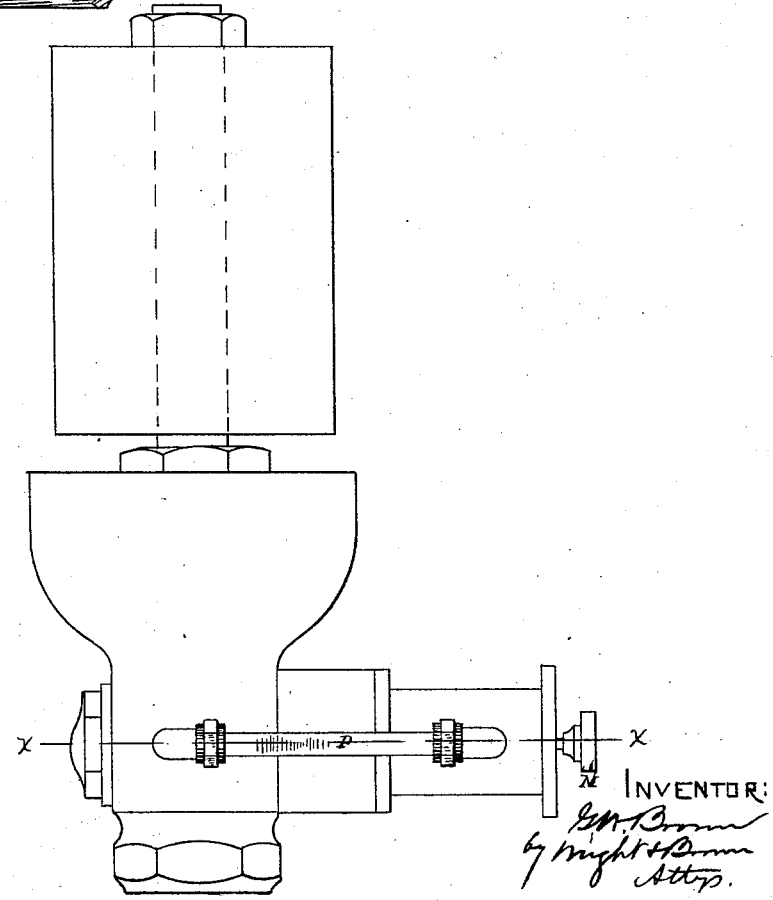
Witnesses:
H Brown
J.E. O'Connor
Inventor:
G. W. Brown
by Wright & Brown
Attys.

UNITED STATES PATENT OFFICE.

GILMAN W. BROWN, OF WEST NEWBURY, MASSACHUSETTS.

SIGNALING APPARATUS.

SPECIFICATION forming part of Letters Patent No. 347,319, dated August 17, 1886.

Application filed September 2, 1885. Serial No. 175,988. (No model.)

*To all whom it may concern:*

Be it known that I, GILMAN W. BROWN, of West Newbury, in the county of Essex and State of Massachusetts, have invented certain new and useful Improvements in Signaling Apparatus, of which the following is a specification.

This invention has for its object to provide an improved apparatus for use on steam-vessels to automatically operate a whistle and give a series of blasts indicating the direction in which the vessel is moving, a suitable code or series of signals being employed, each signal indicating a given general direction of movement, so that in fog or darkness neighboring vessels can avoid each other by the information imparted by the signals.

The invention consists in a series of wheels or disks rotated at a continuous rate by a suitable time-movement, each adapted to close and break an electric circuit a given number of times during a complete rotation, each closure of the circuit causing a blast of a whistle included in said circuit, a laterally-movable contact-arm included in said circuit and adapted to be moved to make contact with either of said disks, a dial or plate marked to indicate cardinal points of the compass, and the principal intermediate points and devices for moving said contact-arm controlled by a combined handle and pointer which is adapted to revolve over said dial, the arrangement being such that when the handle points to a given subdivision of the dial, the contact-arm is in position to co-operate with the circuit closing and breaking disk, which is formed to give the signals belonging to that subdivision, so that by keeping said handle or pointer over that part of the handle that indicates the course of the vessel, the proper signals will be automatically given, all of which I will now proceed to describe and claim.

Figure 1:
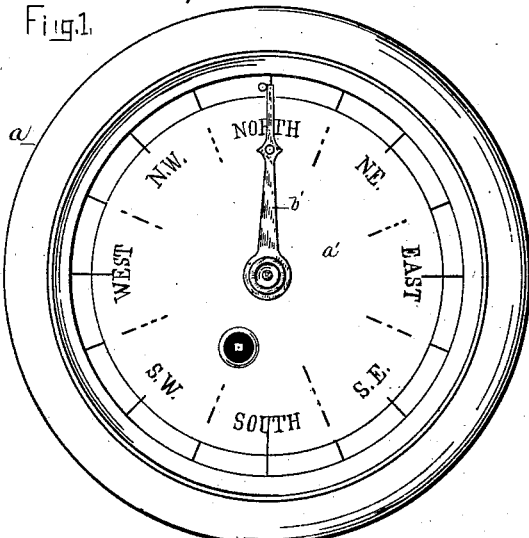
Figure 2:
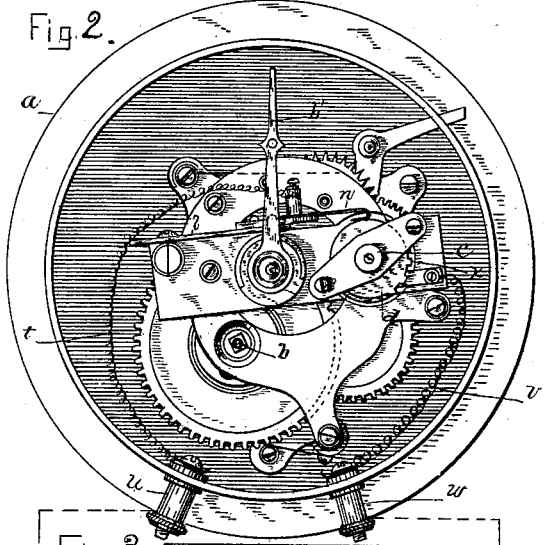
Figure 3:
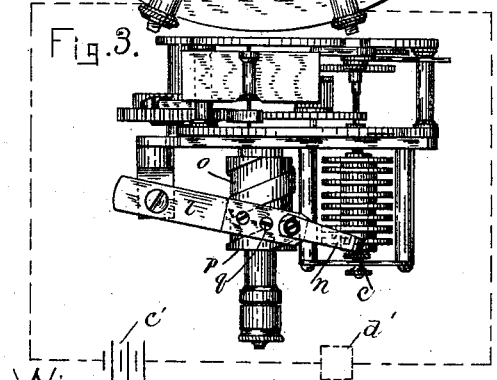
Figure 4:
Figure 5:
Figure 6:
Figure 7:
Figure 8:
Figure 9:
Figure 10:
Figure 11:

Of the accompanying drawings, forming a part of this specification, Figure 1 represents a front elevation of the case, dial, and hand or pointer of my improved signaling apparatus. Fig. 2 represents a similar elevation with the dial removed. Fig. 3 represents a top view of the mechanism removed from the case. Figs. 4 to 11, inclusive, represent side views of the circuit breaking and closing disks used in giving the different signals of the code. Fig. 12 is a sectional view of a steam-whistle and devices for operating the same by the electrical current. Fig. 13 represents a side elevation thereof; and Fig. 14 a section on line $x\, x$, Fig. 13.

The same letters of reference indicate the same parts in all the figures.

In the drawings, $a$ represents a casing, preferably of circular form. Within the casing is a suitable time movement or train driven by a spring on a winding post or arbor, $b$.

$c$ represents an arbor, which is an extension of and is rotated continuously by one of the arbors of the time-movement. To said arbors are affixed a series of disks, $d\, e\, f\, g\, h\, i\, j\, k$, each having a series of teeth or projections, 2, on its periphery, the series on each plate differing from those on the other plates, as shown in Figs. 4 to 10.

$l$ represents an arm pivoted to a stud on the frame of a time-movement, and supporting a metallic contact spring or finger, $n$, which is insulated from the arm by a piece of insulating material. The contact-spring projects over the series of disks $d\, e\, f\, g\, h\, i\, j\, k$, and may be moved to coincide with the periphery of either disk by means of a spiral groove, $o$, in a sleeve or collar, $p$, journaled on a fixed stud projecting from the movement-frame, and a pin, $q$, on the lever $l$, projecting into said spiral groove. The rotation of said sleeve causes the arm $l$ to turn laterally on its pivot and move the contact-spring to any desired point over the series of disks. When the said spring coincides with a disk, only the projections 2 of the disk make contact with the spring as the disk rotates. The contact-arm is provided with a wire, $t$, leading to a screw-cap, $u$, inserted in the case $a$. A wire, $v$, extends from another screw-cap, $w$, insulated from frame in the case to a spring, $x$, which bears against the disk $d$, and is therefore in electrical connection with all the disks of the series. Said wires form parts of an electric circuit which includes a battery and device adapted to be operated by the closure of the circuit to open the valve of a steam-whistle. It will be seen therefore that the contact of the spring $n$ with the projection 2 upon one of the disks will cause a series of whistle-blasts which are governed in number and duration by the number, length, and arrangement of said projections. The case $a$ is provided with a dial, $a'$, having a central opening, through which the spirally-grooved sleeve $p$ or an extension thereof projects. To the outer end of said sleeve is attached a band or pointer, $b'$, which projects over the dial like one of the hands of a clock and constitutes a handle to rotate the sleeve $p$, and thus adjust the contact-point. The face of the dial is divided and marked to indicate the cardinal points of the compass and the principal intermediate points, as shown in Fig. 1, there being eight subdivisions, one for each of the circuit making and breaking disks.

In the signal code now in general use (known as the "Barker code") eight different signals or series of whistle-blasts are used to designate the course of a vessel—one series indicating movement in a northerly direction, another in a northwesterly direction, another in a westerly direction, and so on. The northerly direction consists of four short blasts at regular intervals produced by the contact of the projections of the disk $k$ with the contact-spring; the northwesterly signal consists of a short then a long and then another short whistle; and is produced by the disk $j$. The disk $i$ is formed to give three short whistles, and a longer one, indicating west; the disk $h$, two short whistles and a longer one, indicating southwest; the disk $g$, a long whistle, two shorter ones, and another longer one, indicating south; the disk $f$, two longer whistles, with a shorter one between, indicating southeast; the disk $e$ a longer and three shorter whistles, indicating east; and the disk $d$, a longer and two shorter whistles, indicating northeast. The arrangement of the hand $b'$, grooved collar $p$, and arm $l$ is such that the movement of the hand to any subdivision of the dial moves the contact-spring into coincidence with the disk, which gives the signal for the direction indicated by that subdivision, so that if the hand be kept with the course of the vessel the proper signals will be automatically given, the only attention required being the changing of the hand whenever the vessel's course is changed. The danger of accident from carelessness or lack of judgment or knowledge is therefore greatly reduced, as no mistake can readily occur in the operation of changing the hand from one part of the marked dial to another.

I prefer to place a key to the code in dots and dashes, or shorter and longer marks on the dial, as shown in Fig. 1, for the guidance of all concerned.

I do not limit myself to the specific devices described for converting the revolving movement of the hand into the lateral movement of the contact-spring, it being obvious that said devices may be variously modified without departing from the spirit of my invention.

In Fig. 2 I have shown a diagram of the electric circuit, which includes a battery at $c'$ and whistle-valve-operating mechanism at $d'$.

In Fig. 12 I have shown a steam-whistle having a main steam-passage, A, and a valve, B, of the form used as a stop-valve, &c. Said valve is adapted to stand in a horizontal position, and the stem or spindle of the same extends into a hollow cylinder, D, attached to or forming a part of the whistle-casting. The valve-stem C is secured to a piston, Q, which fits closely in said cylinder D.

The steam-passage from the boiler to the whistle is divided by a partition, E, having an aperture which constitutes the seat of the valve and admits of a constant pressure in the steam-passage on the outer or upper side of the valve B.

F represents a cylinder secured to the cylinder D and provided with a chamber, D', and a steam-passage, H, connecting said chamber with the cylinder D.

I represents an exhaust-passage leading from the induction-passage H, and is adapted to carry off the steam from the cylinder D after it has opened the valve, as hereinafter described.

K represents a cylindrical piece of metal having enlargements L L' fitting closely in the chamber G in the cylinder F. Said piece K constitutes with its enlargements a balance-valve for the purpose of controlling the admission of steam to the cylinders F and D, for the purpose of operating the valve B of the whistle, as explained hereinafter. Said balance-valve is connected to an armature, M, which is controlled by a magnet, N, attached to the cylinder F.

O represents a chamber in the cylinder F, surrounding the balance-valve K L. Said chamber is filled with steam, and the pressure continuously maintained through a pipe, P, passing from the main steam-chamber of the whistle to the said chamber O, as shown in Fig. 14.

When the whistle is to be operated, the armature M is attracted to the magnet N, and the valve is moved sufficiently to withdraw the enlarged portion L' from the chamber O, the steam flows into the chamber D' and through the induction-passage H into the cylinder D, moving the piston Q, so as to lift the valve B from its seat. This movement allows the steam in the outer passage, A, to enter and sound the whistle in the usual manner. When the auxiliary or balance valve is opened to admit steam to the cylinder D, the enlargement L covers the exhaust-passage I, so that the said port is inoperative until the circuit is closed and the pressure of steam in the chamber D' causes the valve to close quickly the passage from the said chamber to the cavity D'. This movement causes the enlargement L to open the exhaust-passage I and relieve the cylinder D and induction-passage H from steam-pressure. It will be observed that the piston Q in the cylinder D is of larger area than the whistle-operating valve B, the object being to more readily overcome the resistance of said valve due to the pressure of steam exerted on its outer surface, the increase of area of the valve Q overbalancing the pressure upon the valve B. I have shown a spiral spring, S, to readily close the valve whenever the pressure on the piston Q ceases.

I do not limit myself to the described means of conducting the steam from the main passage to the cavity O, as said steam may be conducted through passages cored out in the castings composing the device.

It will be seen that by the above-described form of auxiliary valve, the pressure of steam is uniform on all parts of the same, and the valve is perfectly balanced. Moreover, when the armature is released from the magnet the pressure of steam on the enlargement L' serves to close the valve readily and without the aid of springs or other mechanism.

I am aware that it has been proposed to make a signal-transmitter embodying a motor and a series of signaling-surfaces simultaneously moved thereby, combined with a series of co-operating contact-pieces and a movable signal-selecting cylinder provided with a pointer and co-operating with the contact-pieces for throwing any one of the latter into engagement with the corresponding signal-surface, and I do not claim such combination as my invention.

I claim—

1. A circuit closing and breaking apparatus for signaling purposes, consisting of a series of disks having circuit-closing projections, a time-movement whereby said disks are continuously rotated, a movable contact arm or spring adapted to be brought into coincidence with either disk and to make contact with the projections thereof, conducting-wires whereby said contact arm and disk may be included in an electric circuit, a plate or dial suitably subdivided and marked, a hand or pointer adapted to move over the dial, and intermediate devices operated by said hand, whereby the contact-arm may be set to coincide with either disk of the series, the arrangement being such that the position of the hand with reference to the marks upon the dial indicates the disk with which the contact-arm coincides, as set forth.

2. The combination of a steam-whistle, a valve, B, controlling the admission of steam to the whistle and having on its prolonged stem a piston, Q, a cylinder, D, in which said piston is fitted, a casing having a chamber, to a portion of which steam is continuously admitted, a passage, H, for the admission of steam from said chamber to the cylinder D, an exhaust-passage, I, communicating with the passage H, a balanced slide-valve in said chamber, which valve is normally held by the steam-pressure in the chamber to shut off the steam from the cylinder D and to open the exhaust-passage I, and an electro-magnet having an armature which is connected to said balanced valve, and when attracted by the magnet moves said valve and thereby opens the passage H and closes the exhaust I, steam being thus admitted to the cylinder D, for the purpose of opening the whistle-valve, as set forth.

3. The combination of the series of disks having projections, as described, a time-movement whereby said disks are continuously rotated, a contact arm or spring adapted to coincide with either disk and make contact with its projections, means, substantially as described, whereby the contact-arm may be set to coincide with either disk of the series, an electro-magnet included in an electric circuit with said arm and disks, a steam-whistle, a valve therefor, and an armature arranged to be operated by said electro-magnet and to operate the whistle-valve, as set forth.

4. The combination of the series of disks having projections, as described, a time-movement whereby said disks are continuously rotated, a steam-whistle, a valve therefor, an electro-magnet included in an electric circuit with said disks, an armature arranged to be operated by said electro-magnet and to operate the whistle-valve, a circuit-closer whereby the electric current may be closed through either of said disks, and indicating operating devices, substantially as described, whereby the circuit-closer may be operated and its position indicated, as set forth.

In testimony whereof I have signed my name to this specification, in the presence of two subscribing witnesses, this 29th day of August, 1885.

GILMAN W. BROWN.

Witnesses:
C. F. BROWN,
H. BROWN.